(12) United States Patent
Kanno et al.

(10) Patent No.: US 7,478,425 B2
(45) Date of Patent: Jan. 13, 2009

(54) SERVER COMPUTER PROTECTION APPARATUS, METHOD, PROGRAM PRODUCT, AND SERVER COMPUTER APPARATUS

(75) Inventors: Shin-ichi Kanno, Kawasaki (JP); Masamichi Tateoka, Higashimurayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 725 days.

(21) Appl. No.: 10/241,565

(22) Filed: Sep. 12, 2002

(65) Prior Publication Data

US 2003/0061306 A1    Mar. 27, 2003

(30) Foreign Application Priority Data

Sep. 27, 2001  (JP)  ............................. 2001-295368
Mar. 29, 2002  (JP)  ............................. 2002-093667

(51) Int. Cl.
  *G06F 9/00*   (2006.01)
  *G06F 15/16*  (2006.01)
  *G06F 17/00*  (2006.01)

(52) U.S. Cl. .................. 726/12; 709/217; 709/227; 713/153; 713/171

(58) Field of Classification Search .............. 726/22, 726/12
See application file for complete search history.

(56) References Cited

U.S. PATENT DOCUMENTS

| 6,199,113 | B1 * | 3/2001 | Alegre et al. ................ 709/229 |
| 6,212,640 | B1 * | 4/2001 | Abdelnur et al. .............. 726/2 |
| 6,247,054 | B1 | 6/2001 | Malkin |
| 6,735,219 | B1 * | 5/2004 | Clauberg .................... 370/474 |
| 6,907,525 | B2 | 6/2005 | Pazi et al. |
| 7,051,369 | B1 | 5/2006 | Baba et al. |
| 2001/0042200 | A1 * | 11/2001 | Lamberton et al. .......... 713/151 |
| 2002/0029269 | A1 * | 3/2002 | McCarty et al. ............. 709/225 |
| 2002/0116475 | A1 * | 8/2002 | Berg ......................... 709/219 |
| 2002/0138599 | A1 * | 9/2002 | Dilman et al. .............. 709/223 |
| 2002/0138643 | A1 | 9/2002 | Shin et al. |

FOREIGN PATENT DOCUMENTS

EP    1 081 894 A1    3/2001

(Continued)

OTHER PUBLICATIONS

Schuba, C.L. et al., "Analysis of a Denial of Service Attack on TCP", Security and Privacy, 1997, Proceedings, 1997 IEEE Symposium in Oakland, CA, May 4-7, 1997, Los Alamitos, CA, IEEE Comput. Soc., May 4, 1997, pp. 208-223.

(Continued)

*Primary Examiner*—Emmanuel L Moise
*Assistant Examiner*—Shewaye Gelagay
(74) *Attorney, Agent, or Firm*—Finnegan, Henderson, Farabow, Garrett & Dunner, L.L.P.

(57) ABSTRACT

A server computer protection apparatus for protecting a server computer by allowing only proper access from one or more client computers to reach the server computer. An access request receiving unit receives, in place of the server computer, access requests sent from the client computers. Each received access request is checked by an access request checking unit to determine whether the received access request is proper or not. An access request transfer unit transfers to the server computer only the access request that is determined as proper, while preventing other access requests that are determined as improper from transferring to the server computer.

13 Claims, 13 Drawing Sheets

FOREIGN PATENT DOCUMENTS

| | | |
|---|---|---|
| JP | 8-249249 | 9/1996 |
| JP | 10-3357 | 1/1998 |
| JP | 2000-122939 | 4/2000 |
| KR | 2001-0081872 | 8/2001 |

OTHER PUBLICATIONS

Stevens, W.R., "TCP Timeout and Retransmission", TCP/IP Illustrated, vol. 1: The Protocols, Professional Computing Series, Reading, MA, Addison Wesley, 1994, pp. 297-337.

Hubbard, S.D., et al., "Firewalling the Net", BT Technology Journal, BT Laboratories, vol. 15, No. 2, Apr. 1, 1997, pp. 94-106.

"IP SCFW, SYN Cookies Firewall", Oct. 21, 2000.

IBM: "Tivoli Management Framework, Firewall Security Toolbox User's Guide", Version 1.3.

European Search Report.

Notification of Reasons for Rejection issued by the Japanese Patent Office in corresponding Application JP2002-093667, dated Dec. 18, 2007.

Satoshi Hanzawa, "Basic of Firewall Checked at 5 Steps," *Nikkei Network*, No. 10, Japan, Nikkei Business Publications, Inc. pp. 74-85 (2001).

ROOtZer0, "The Manual of the Computer Evil III," "The Manual of the Computer Evil," vol. 3, 1st edition, Japan, Datahouse, pp. 366-387, Feb. 29, 2000.

Final Notice of Rejection issued by the Japanese Patent Office on Sep. 16, 2008, for Japanese Patent Application No. 2002-093667, and English-language translation thereof.

* cited by examiner

SERVER COMPUTER PROTECTION APPARATUS, METHOD, PROGRAM PRODUCT, AND SERVER COMPUTER APPARATUS

CROSS-REFERENCE TO RELATED APPLICATIONS

This application is based upon and claims the benefit of priority from the prior Japanese Patent Applications No. 2001-295368, filed Sep. 27, 2001; and No. 2002-093667, filed Mar. 29, 2002, the entire contents of both of which are incorporated herein by reference.

BACKGROUND OF THE INVENTION

1. Field of the Invention

The present invention relates to a network system between client computers and server computers and, more particularly, to a server computer protection apparatus for protecting a server computer against improper access that intentionally interfere with the processing of a server computer.

2. Description of the Related Art

Nowadays, computer server systems are widely used, in which an indefinite or definite number of client computers are connected to a server computer through a packet switching network, and data packets are supplied from the server computer in accordance with request packets from the client computers. A packet is a certain amount of data sent through a network. A packet basically includes a header and data body. The header contains the IP (Internet Protocol) address of a transmission destination, a source IP address, a transmission sequence number indicating the ordinal relationship between packets, and the like.

A proper access request procedure in TCP/IP (Transmission Control Protocol/IP), which is one example of a connection-type protocol. For example, FIG. 18 shows the procedure in which:

(a) a client computer sends a connection request packet (SYN (Synchronous) packet) to a server computer, (b) the server computer sends a connection request acknowledgement packet (SYN+ACK (Acknowledgement) packet) to the client computer, (c) the client computer sends an acknowledgement packet (ACK packet) to the server computer to establish a logical communication path (connection), which is called "3-way handshake scheme", (d) the client computer sends a data request packet to the server computer while the connection is previously established, wherein the data request packet is, for example, URL (Uniform Resource Locator) packet, (e) the server computer sends the data packet requested by the URL packet from the client computer thereto. The data packet is finally received by the client computer.

There is a growing tendency toward attacks on a server computer by improper access from a client computer. The intention of the attack by improper access is to interfere with, for example, services provided by the server computer. Data provided from the server computer in response to a proper access request is actually received at the client computer side and used if the proper access request is done from the client computer to server computer. However, the access request intended to attack the server computer is made not for the purpose of receiving a data supply but for the purpose of improper accessing.

An attack to disable the data supply service provided by a target server computer by sending a large quantity of similar access requests from one client computer to the server computer is referred to as a DoS attack (Denial of Service attack). The DoS attack is difficult to discriminate from access from a proper client, and hence it is difficult to take effective measures against such attacks. There is also another form of an attack in which a plurality of client computers make DoS attacks together.

For example, general DoS attacks on the Internet harm server computers in the following manner.

(1) As shown in FIG. 19, sending a large amounts of SYN packets in a quantity exceeding the capacity of the server computer thereto, thus preventing the server computer from sending any SYN+ACK packet ("SYN flood", hereinafter).

(2) As shown in FIG. 20, one or more improper client computers send a large number of sets of SYN and ACK packets to a server computer to establish a connection with the server computer. These clients do not send any packet such as URL packet which is originally to be sent out from a client computer side within a predetermined period of time. Thereby the server computer is left standing with establishing connection ("Established flood", hereinafter).

(3) As shown in FIG. 21, each client computer makes proper access of sending URL packets through established connections as proper client computers do. Such proper access is done by a number of client computers substantially at the same time (at a predetermined time, for example). Thereby a large amount of accesses are concentrated on a certain server computer and its processing load is increased to interfere the normal operation of the server computer. Such attack is especially called DDoS attack (Distributed Denial of Service attack) ("Access flood", hereinafter).

When a server computer undergoes such attacks, resources are wasted such as a memory in the server computer because it needs to ensure, for example, data supply memory for each connection request. This greatly interferes with normal access from client computers having no intention of doing harm.

A server computer protection apparatus to be placed between server computers and network is conventionally provided in order to protect the server computer against such attacks. With regard to SYN flood, the conventional server computer protection apparatus processes only the connection request which is repeated a plurality of times as a proper connection request or processes the access request from a client which has already made proper access as a proper connection request. This apparatus regards other kinds of accesses as improper accesses to reject them and discards the corresponding packets.

If, however, an attacker issues the same connection request many times to the conventional computer protection apparatus, an attack becomes successful. In addition, the conventional apparatus cannot cope with Established flood and Access flood.

Such conventional server computer protection apparatus merely operates such that improper accesses are actively detected to be blocked. It is desirable that a server computer protection apparatus protects the server computer by operating a determination process that determines whether or not an access is normal, then allows the access to pass through the apparatus if the access is determined normal or makes the access which cannot pass through the apparatus stay in it.

BRIEF SUMMARY OF THE INVENTION

It is an object of the present invention to provide a server computer protection method and apparatus which can fully protect a server computer against DoS attacks.

According to embodiments of the present invention, there is provided a server computer protection apparatus for protecting a server computer by allowing only proper access from one or more client computers to reach the server computer, comprising: an access request receiving unit configured to receive, in place of the server computer, access requests sent from the client computers; an access request checking unit configured to check each received access request to determine whether the received access request is proper or not; and an access request transfer unit configured to transfer to the server computer only the access request that is determined as proper, while preventing other access requests that are determined as improper from transferring to the server computer.

According to embodiments of the present invention, there is provided a server computer protection method of protecting a server computer by allowing only proper access from one or more client computers to reach the server computer, comprising: receiving, in place of the server computer, access requests sent from the client computers; checking the access request to determine whether each received access request is proper or not; and transferring to the server computer only the access request that is determined as proper, while preventing other access requests that are determined as improper from transferring to the server computer.

According to embodiments of the present invention, there is provided a server computer apparatus which communicates with one or more client computers, comprising: a server computer unit; and a server computer protection unit including: an access request receiving unit configured to receive, in place of the server computer unit, access requests sent from the client computers; an access request checking unit configured to check each received access request to determine whether the received access request is proper or not; and an access request transfer unit configured to transfer to the server computer unit only the access request that is determined as proper, while preventing other access requests that are determined as improper from transferring to the server computer unit.

According to embodiments of the present invention, there is provided a computer program product comprising: a computer storage medium and a computer program code mechanism embedded in the computer storage medium for causing a computer to protect a server computer apparatus by allowing only proper access from one or more client computer apparatuses to reach the server computer apparatus, the computer code mechanism comprising: a code segment for receiving, in place of the server computer apparatus, access requests sent from the client computer apparatuses; a code segment for checking each received access request to determine whether the received access request is proper or not; and a code segment for transferring to the server computer apparatus only the access request that is determined as proper, while preventing other access requests that are determined as improper from transferring to the server computer apparatus.

DETAILED DESCRIPTION OF THE INVENTION

Embodiments of the present invention will be described below with reference to the views of the accompanying drawing.

Figure 1:
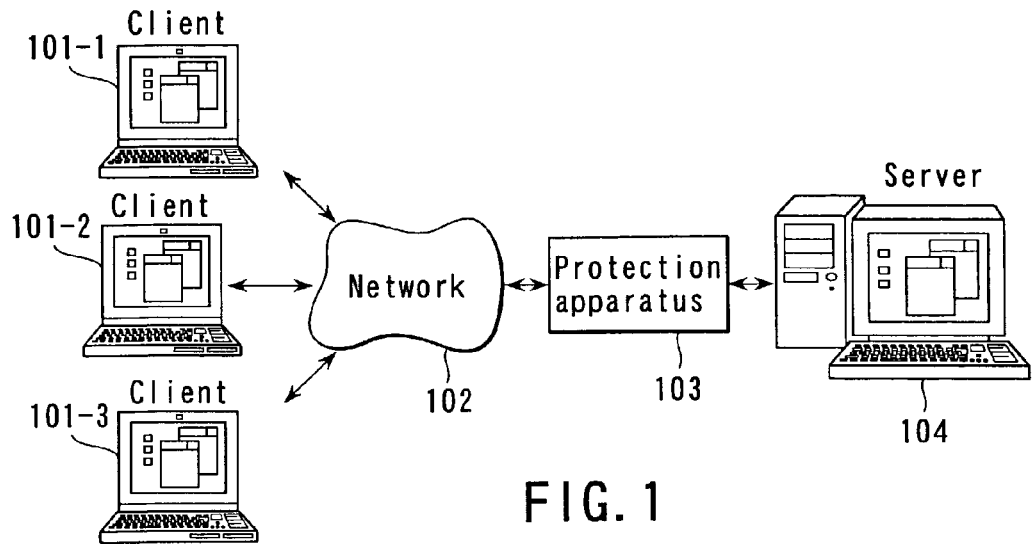
FIG. 1 is a network system to which server computer protection apparatus according to an embodiment of the present invention is applied.

FIG. 1 is a schematic view showing a network system in which a server computer protection apparatus according to the embodiments of the present invention is implemented. In the system, a server computer 104 is connected to a network 102 through a server computer protection equipment 103. The server computer 104 exchanges data packets with client computers 101-1, 101-2, 101-3 (hereinafter, collectively "client computer 101"), which connected to the network 102, through the server computer protection equipment 103 without fail.

(First Embodiment)

Figure 2:
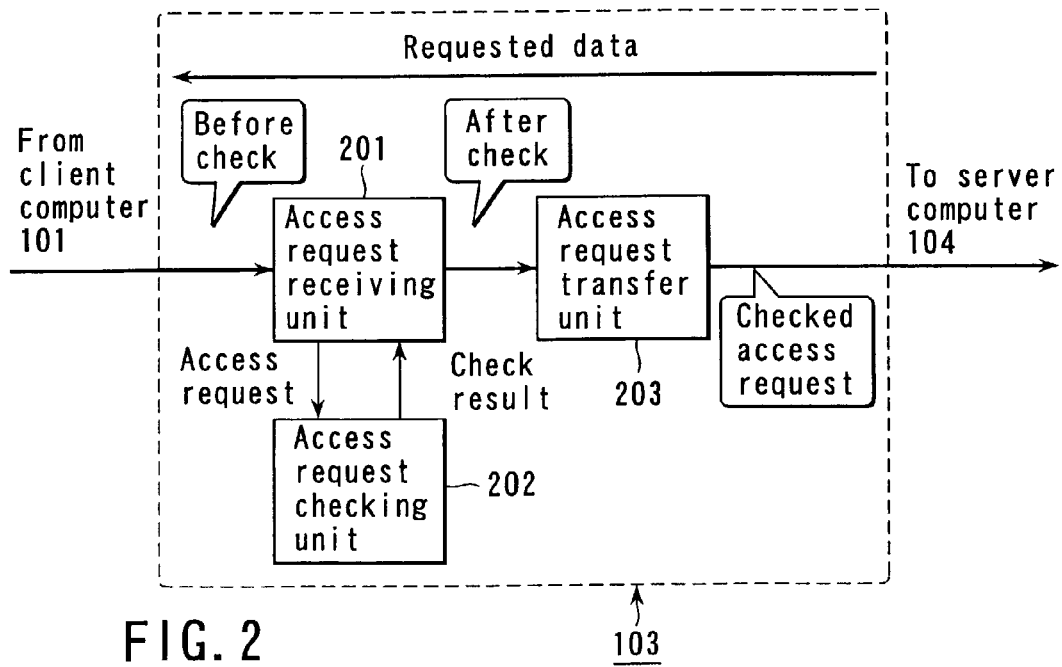
FIG. 2 is a block diagram illustrating a schematic structure of a server computer protection apparatus according to the first embodiment of the present invention.

FIG. 2 is a block diagram illustrating a schematic structure of server computer protection apparatus (hereinafter, "protection apparatus") 103 according to the first embodiment of the present invention. The protection apparatus 103 includes an access request receiving unit 201, access request checking unit 202, and access request transfer unit 203. The protection apparatus 103 receives and checks an access request to a server computer 104 in place of the server computer 104.

An access request packet before a check, which is sent from a client computer 101, is received by the access request receiving unit 201, and then transferred to the access request checking unit 202. Access request packets include packets in three stages, namely a connection request packet (SYN packet), acknowledgement packet (ACK packet), and data request packet (referred to "URL packet" as an example in an explanation of embodiments). The access request checking unit 202 checks whether or not the sequence of access request packets has arrived in the proper order at proper periods.

The check result of access request packet by the access request checking unit 202 is notified to the access request receiving unit 201. The checked access request packet is sent to the access request transfer unit 203. The checked access request packet is transferred from the access request transfer unit 203 to a server computer 104 if the check result is normal.

Figure 3:
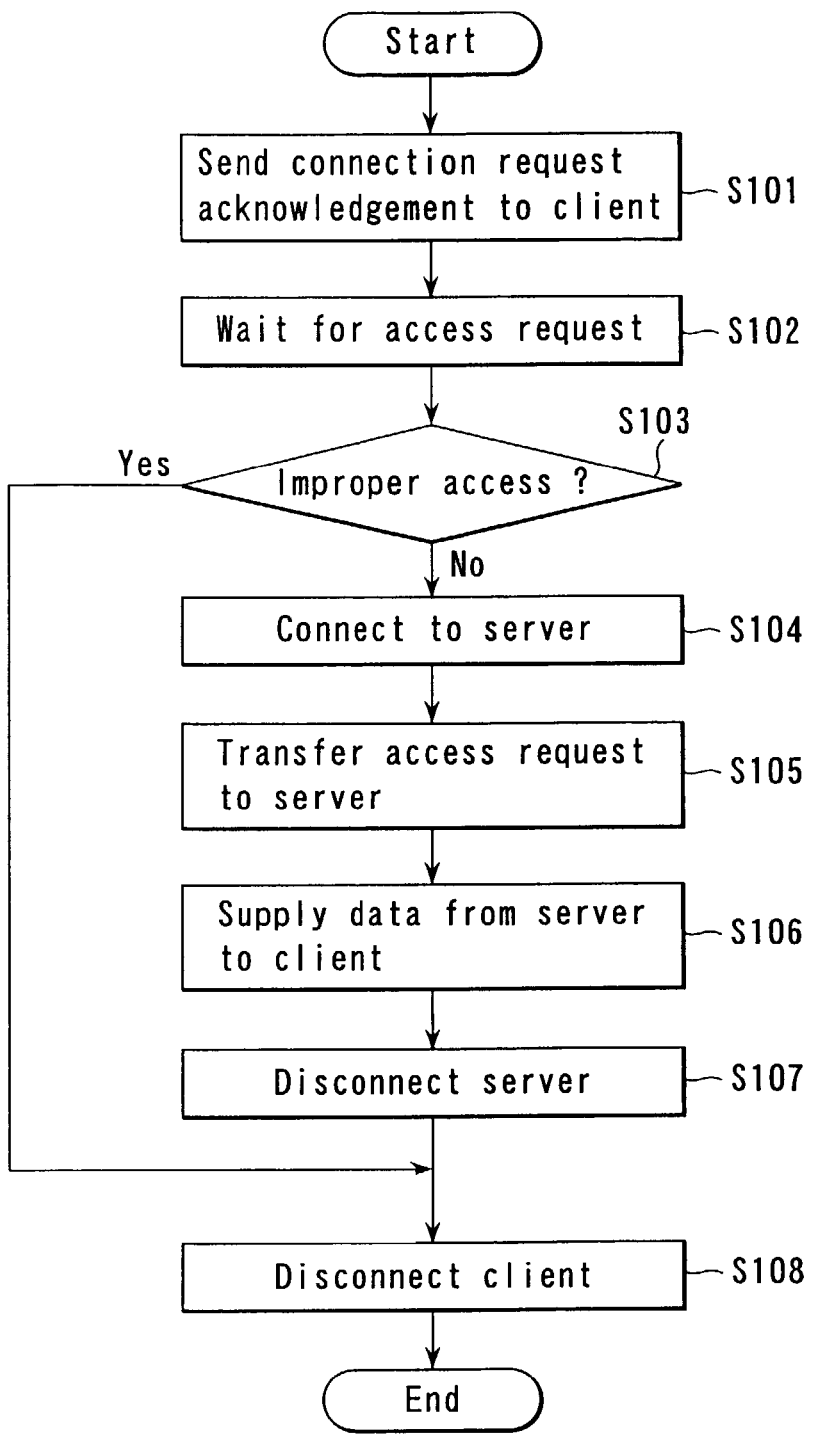
FIG. 3 is a flow chart showing a processing operation of the server computer protection apparatus according to the first embodiment.

The flow of overall processing by the server computer protection equipment 103 will be described below with reference to the flow chart of FIG. 3. First, upon reception of a connection request packet (SYN packet) from the client computer 101, the server computer protection equipment 103 sends a connection request acknowledgement (SYN+ACK) packet to the client computer (S101), and transits to a waiting state for an access request packet (i.e., ACK packet or URL packet) in the next stage (S102).

Here, the access request checking unit 202 checks in step S103 whether or not the access request is a proper access request (it can be put in another way as "whether or not it is improper access request"). The conditions applied to the check include, for example, determining if URL packets is sent from the client computer 101 in a predetermined period of time while connection is established. It should be noted that the conditions to the access request should be not for improper access request but for proper access request.

In step S103 in this embodiment, access requests of SYN flood including Established flood described in the Description of the Related Art are eliminated as improper accesses since URL packets are not send within a predetermined period of time, in the case of SYN flood including Established flood occurred.

If the access request is determined as a proper request after the check, the access request transfer unit 203 connects to the server computer 104 (S104) and transfers the proper access request to the server computer 104 (S105). The server computer 104 supplies the data designated by the URL packet to the client computer 101 through the server computer protection equipment 103 on a packet basis (S106). The server computer protection equipment 103 disconnects from the server computer 104 upon the completion of data supply (S107), and also disconnects from the client computer 101. If the access request is determined as an improper request in step S103, the step goes to S108 and a disconnection processing for the client is executed.

The stricture of more practical embodiment of the present invention is, for example, described below.

A protection apparatus 103 includes a clock unit for measuring the progress at the time after establishing the connection with the client computer 101 until a data request packet arrives. If a predetermined kinds of packet (for example, data request packet) is not sent to a data request receiving unit 201, the protection apparatus 103 determines that there is an improper access and cancels the connection. Thereby resource allocations in the protection apparatus 103 are prevented from being oversized and resources such as a memory can be quickly allocated in response to a connecting operation by the proper client computer 101

Also, the protection apparatus 103 may determine an access, which has long progress of the time after establishing a connection until a data request packet arrives, as an improper access and cancel the connection.

The protection apparatus 103 may be further equipped with a count unit for counting the number of times of requests made to the same data by the same client computer in a predetermined period of time.

When the number of times of requests to the same data is grater than a predetermined number of times within the predetermined period of time, the protection apparatus 103 determines that the access is improper and cancels the connection.

According to the embodiment described above, a server computer is protected against a DoS attack such as SYN flood including Established flood. The structure for fully protecting a server computer against attacks including Access flood, which is described in the Description of the Related Art, will be explained in another embodiment.

The person skilled in the art will recognize that the conditions which are used by the access request checking unit 202 to check an access request in step S103 is not limited to the time period until arrival of an URL packet as described above (an access request which sends, for example, only a SYN packet is eliminated). For example, an access request which must never be given to the server computer 104 may be used as the conditions. In the case, for example, an access is allowed to pass through as a proper access if the access request is not apparently an improper URL packet.

The embodiment may be modified as following. Each packet of one of stages which consist an access request is not transferred to the server computer 104 until the packets of all the stages are received by the access request receiving unit 201. When the packets of all the stages are received by the access request receiving unit 201 then the received packets are checked at the data request checking unit 202 and determined as a proper access request, the access request transfer unit 203 then transfers the determined packets to the server computer 104.

(Second Embodiment)

Figure 4:
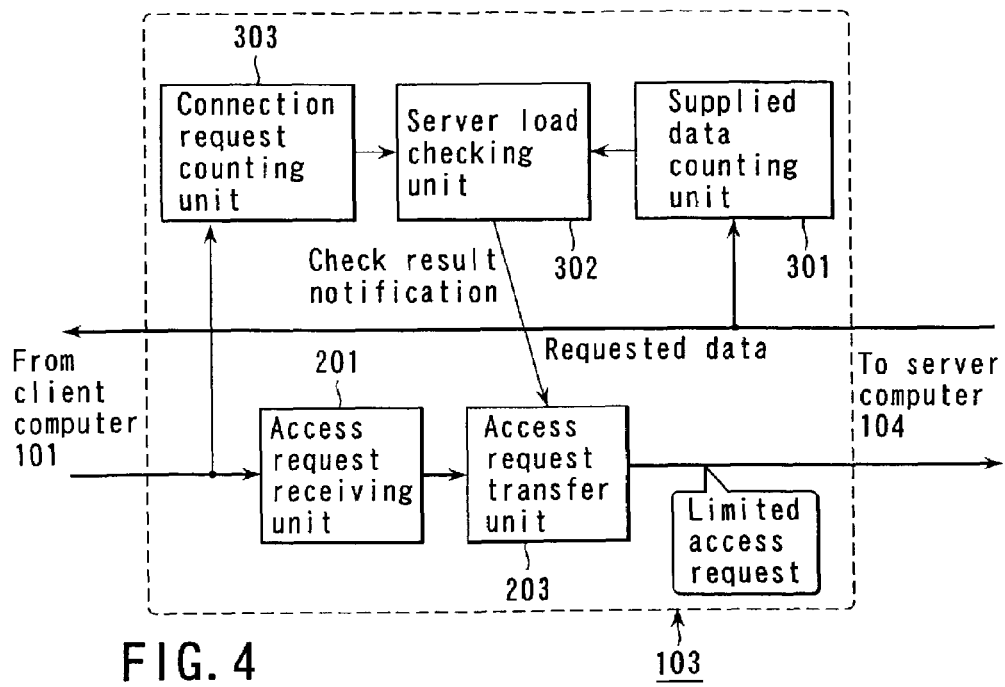
FIG. 4 is a block diagram illustrating a schematic structure of a server computer protection apparatus according to the second embodiment of the present invention.

FIG. 4 is a block diagram illustrating a schematic structure of a server computer protection apparatus according to the second embodiment of the present invention. The embodiment relates a server computer protection apparatus which detects an improper request packet, which can give a excessive load on a server computer 104, based on data supplying states from the server computer 104 so that the server computer 104 is protected. The protection apparatus 103 shown in FIG. 4 determines whether or nor the number of connection requests (the number of SYN packets) sent from the client computer 101 is in oversupply as compared with the number of data supply from the server computer 104. When the number of the connection request becomes in oversupply, the protection apparatus 103 determines that the load to the server computer 104 is excessive and limits transferring of the access request to the server computer 104 (or stops the transferring and refuses the access request).

As shown in FIG. 4, the server protection apparatus 103 of this embodiment includes a connection request counting unit 303 and server load checking unit 302, which are provided in place of access request checking unit 202 for checking the content of access requests described in the first embodiment.

A connection request packet (SYN packet) from the client computer 101 is received by an access request receiving unit

201. The connection request packet is also input to the connection request counting unit 303. The connection request counting unit 303 counts the number of connection requests of the server computer 104. The number of connection requests includes the total number of SYN packets which are requested from all of the client computers including the client computer 101 to the server computer 104. Note that, in general, a plurality of connections are set between one client computer and a server computer.

A supplied data counting unit 301 always or periodically counts the number of data supplied from the server computer 104. The number of data supplied means the number of times data is actually supplied upon reception of a given connection request through an established connection.

The flow of overall processing by the protection apparatus 103 will be described below with reference to the flow chart of FIG. 5A.

At first, the protection apparatus 103 is in a wait state for a connection request (S201). When a SYN (connection request) packet from the client computer 101 is accepted by the connection request counting unit 303, a server load checking unit 302 checks, on the basis of the number of data supplied counted by the counting unit 301 and the number of connection requests counted by the connection request counting unit 303, whether the load on the server computer 104 is excessive or not (S202). Specifically, for example, if the number of data supplied is relatively small as compared with the number of connection request packets (SYN packets), it is determined that the number of connection request packets is excessive and the load on the server computer 104 may also be excessive. Note that, in step S202, the connection request counting unit 303 may count the number of data request (the total number of URL packets) in place of counting the number of connection requests (the total number of SYN packets).

If it is determined in step S202 that the number of connection requests is not excessive, the protection apparatus 103 connects to the client computer 101 having requested an access (S203), and transits to a data request waiting state (S204). At this time, the server load checking unit 302 increases the number of connections by one (S205).

The protection apparatus 103 then connects to the server computer 104 (S206) and transfers a data request packet (URL packet) which is sent from the client computer 101, to the server computer 104 (S207). After the server computer 104 supplies data to the client computer 101 (S208), the protection apparatus 103 disconnects from the client computer 101 and server computer 104 (S209). The server load checking unit 302 decreases the number of connections by one (S210).

In contrast to this, if it is determined in step S202 that the number of connection requests is excessive, namely, the load on the server computer 104 is excessive, the protection apparatus transits to a wait state for a connection request (S201).

According to this embodiment, it is possible to prevent the load on the server computer 104 from becoming excessive due to DoS attacks and keep the throughput of the server from decreasing.

Figures 5A, 5B:
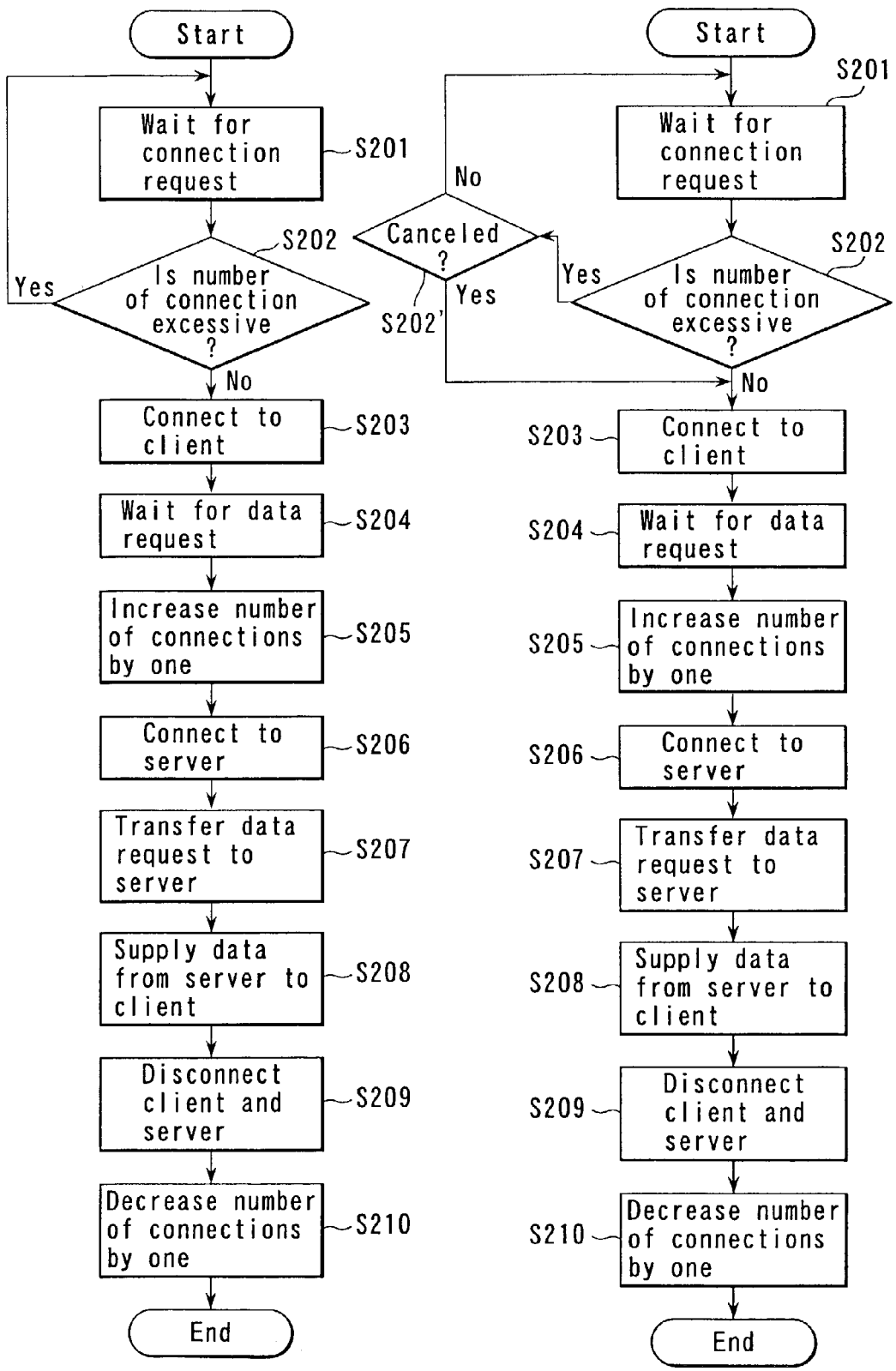
FIGS. 5A and 5B are flow charts showing a processing operation of the server computer protection apparatus according to the second embodiment.

FIG. 5B shows a modification of the processing operation shown in FIG. 5A.

If it is determined in step S202 that the number of connection requests is excessive, the step S202' in FIG. 5B determines if the oldest one of connections that has not undergo connection processing, should be canceled or not. If the number of connection requests exceeds the number of connections that can be handled by the protection apparatus 103, the oldest connection is canceled. Then, the process moves to step S203 of connecting to a client computer. The subsequent processing is the same as that shown in FIG. 5A. If it is determined in step S202' that the number of connections does not exceed the number of connections that can be handled by the protection apparatus 103, a wait state for a connection request is restored (S201).

By canceling the oldest one of connections according to this modification, a service can be continued even when a DoS attack is made to the protection apparatus itself. The second embodiment is especially suitable for coping against attacks including Access flood, which is described in the Description of the Related Art.

(Third Embodiment)

Figure 6:
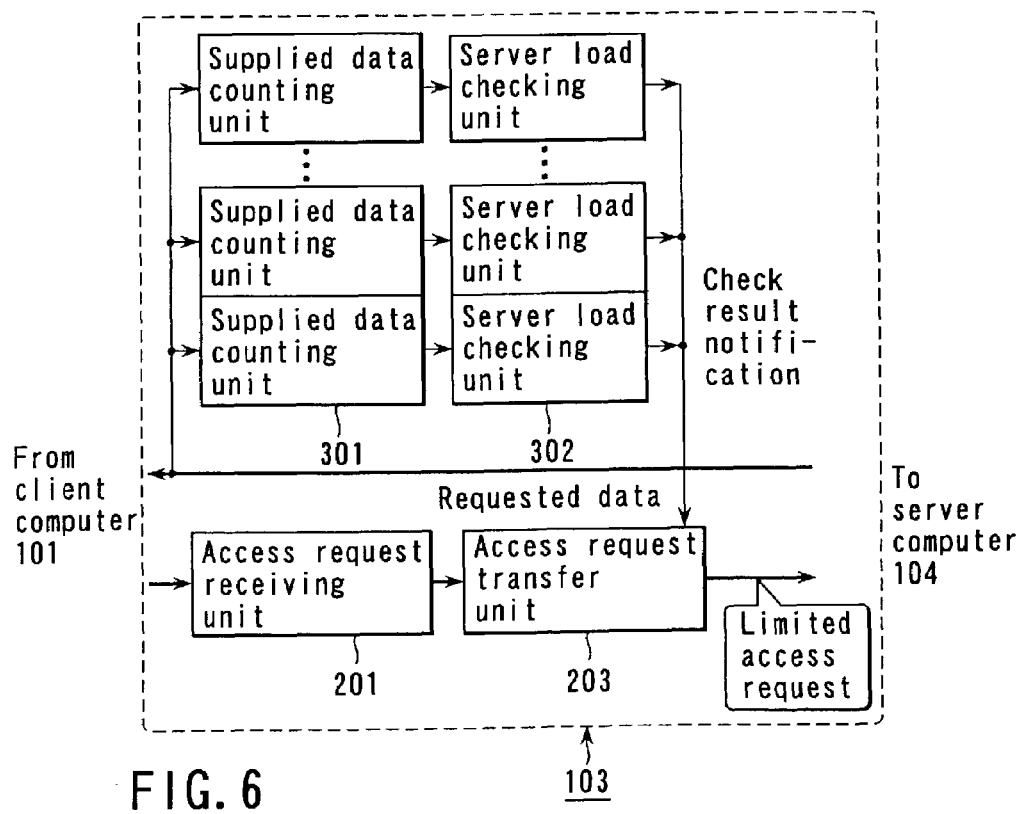
FIG. 6 is a block diagram illustrating a schematic structure of a server computer protection apparatus according to the third embodiment of the present invention.
Figure 7:
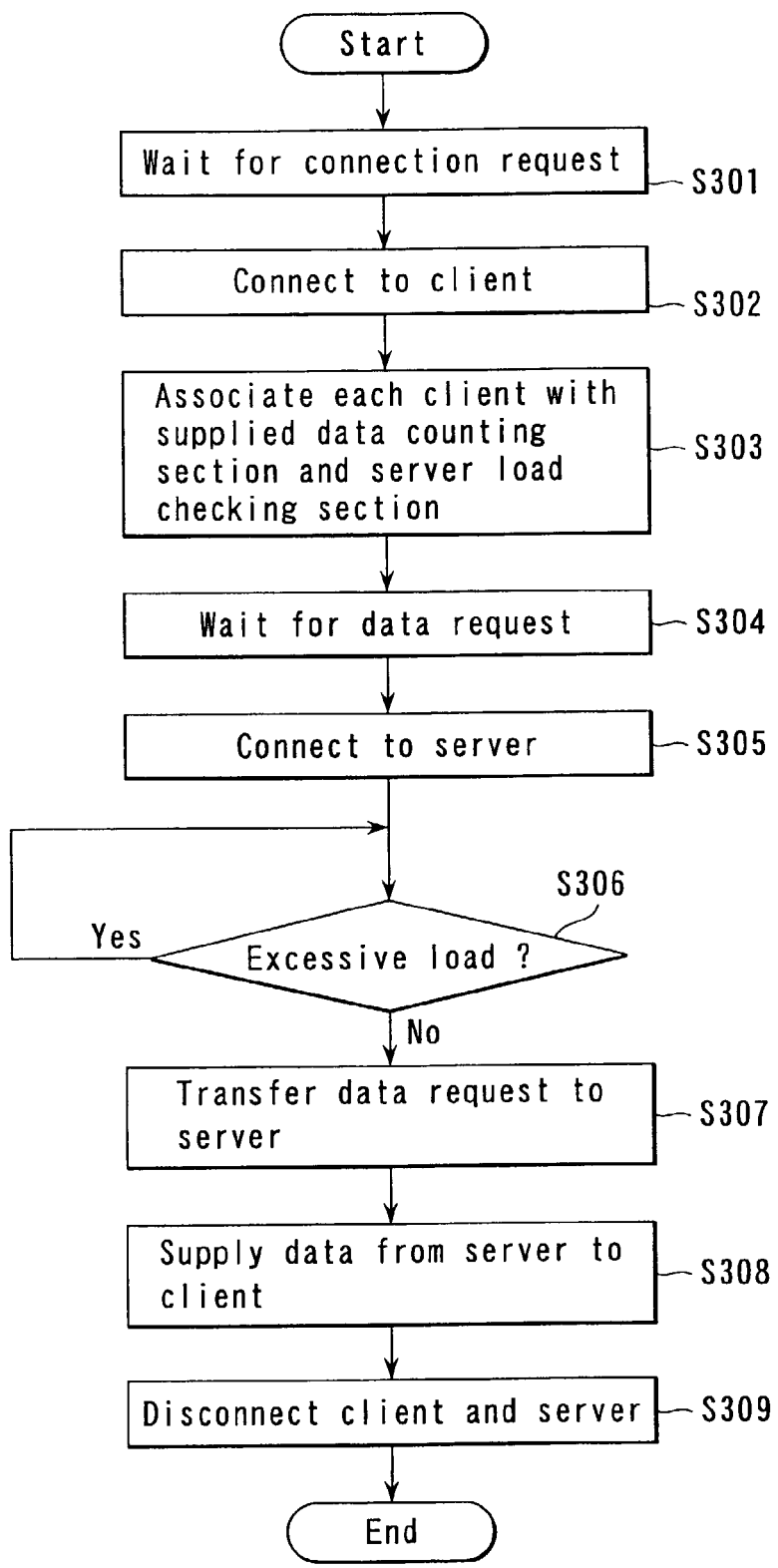
FIG. 7 is a flow chart showing a processing operation of the server computer protection apparatus according to the third embodiment.

FIG. 6 is a block diagram showing a schematic structure of a server computer protection apparatus 103 according to the third embodiment. FIG. 7 is a flow chart illustrating the processing operation conducted by the apparatus according to this embodiment. This embodiment comprises a number of supplied data counting units 301 that count the number of data supplies for each client computer which has sent an access request, and server load checking units 302 that check the load on the server computer also for each client computer, described in connection with the second embodiment. It should be noted that it suffices if the data counting units 301 and server load checking units 302 have simple calculation functions, and therefore even if a great number of these units are provided, the memory or CPU resources of the protection apparatus 103 are not very much taken up. Consequently, about the same number of pairs of data counting units 301 and server load checking units 302 can be provided for 1,000 to 10,000 client computers, respectively. It is alternatively possible that a pair of a data counting unit 301 and a server load checking unit 302 are associated with each one of an plurality of already established connections in a specific client computer.

As shown in FIG. 7, in an initial stage, the protection apparatus 103 in a wait state for a connection request (S301). Then, when the apparatus 103 receives a SYN packet and ACK packet from a specific client computer (for example, any one of 101-1, 101-2, 101-3 shown in FIG. 1), the protection apparatus 103 establishes a connection with the specific client computer (S302). Then, the apparatus associate the specific client computer with one pair of a data counting unit 301 and a server load checking unit 302. For some other specific client computer for which some other connection has been established, some other pair of a data counting unit 301 and a server load checking unit 302 are associated.

The protection apparatus 103 is then set in a wait state for an access request from the specific client computer (S304). When an access request is sent from the specific client computer, the access request is immediately received by an access request receiving unit 201 and sent to an access request transfer unit 203. The access request transfer unit 203 transfers the access request to a server computer 104, and thus a connection is established between the specific client computer and the server computer 104 (S305).

The supplied data counting unit 301 counts data supplied to the specific client computer to which the server computer 104 is currently supplying requested data, and the server load checking unit 302 checks whether the load on the server from the specific client computer is excessive or not (S306).

If the load does not exceed the predetermined load, the server load checking unit 302 instructs the access request transfer unit 203 to transfer a URL packet to the server computer 104 (S307). The server computer 104 then supplies the requested data to the specific client computer (S308). Upon the completion of data supply, the protection apparatus 103 cuts the connection between the specific client computer and the server computer.

If the load exceeds the predetermined load, the processing in step S306 is performed again to stop the access request transfer unit 203 from transferring a data request packet to the server computer 104, and the protection apparatus 103 waits until the number of data supplied to the specific client computer decreases. In the case where the specific client computer is not authorized one, it is preferable that the connection should be forcedly cut after waiting for a predetermined period.

The above-described embodiment makes it possible to prevent the load on the server computer 104 from becoming excessive and also prevent a specific client computer from occupying the server computer 104, thus suppressing interference with data supply to other client computers. Therefore, this can also cope with Access flood described in "Description of the Related Art".

(Fourth Embodiment)

Figure 8:
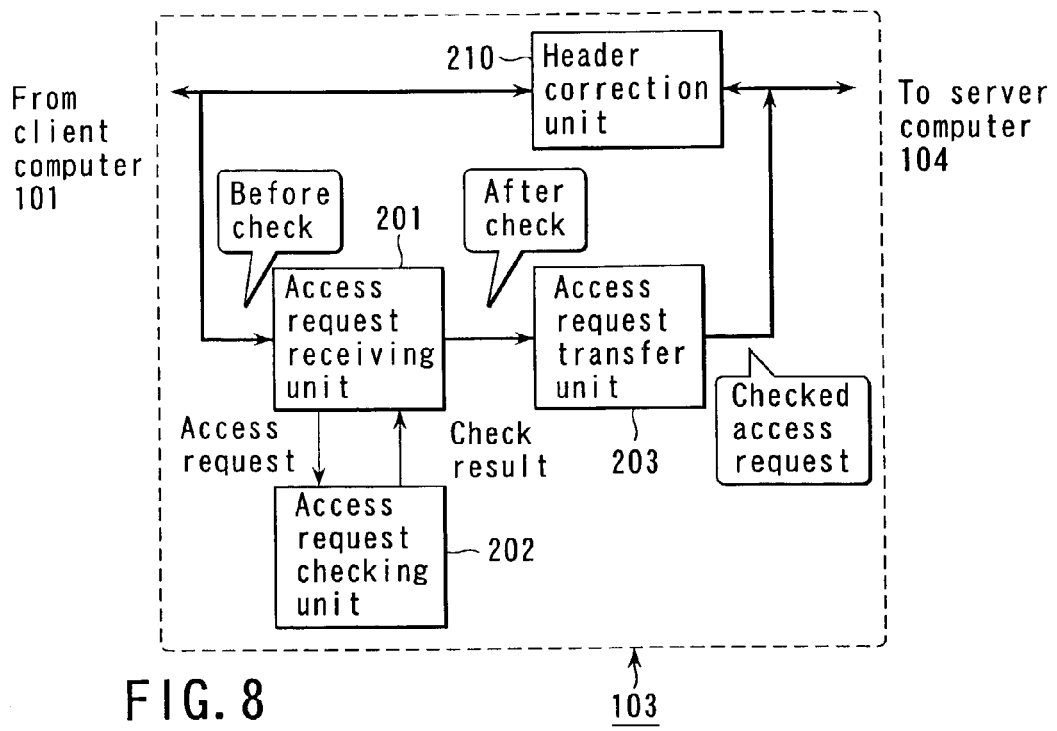
FIG. 8 is a block diagram illustrating a schematic structure of a server computer protection equipment according to the fourth embodiment of the present invention.

FIG. 8 is a block diagram showing a schematic structure of a server computer protection apparatus 103 according to the fourth embodiment. This embodiment is basically the same as the first embodiment, but has a header correcting unit 210. The header correcting unit 210 is provided for an appropriate packet sequence control that is carried out after the connection process, even if the protection apparatus 103 mediating between the client computer 101 and server computer 104 checks packets before these computers are connected.

Figure 9:
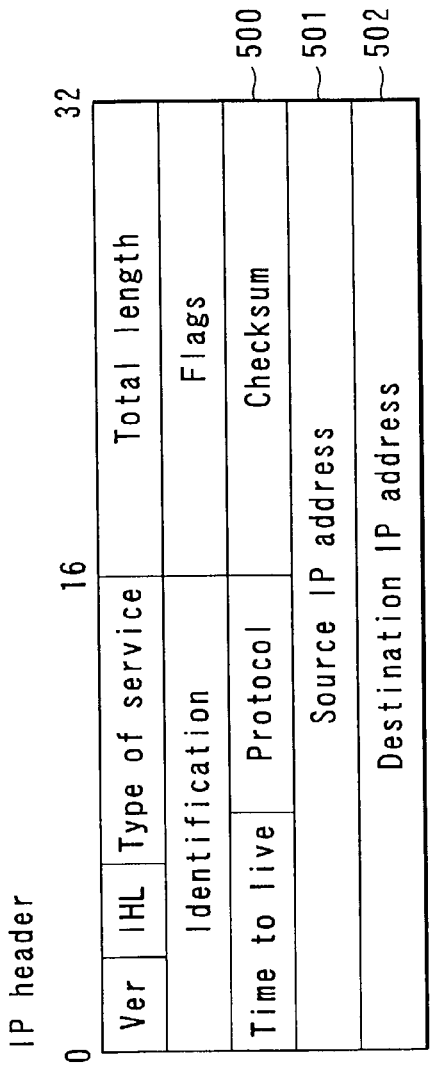
FIG. 9 shows typical IP header in TCP/IP.
Figure 10:
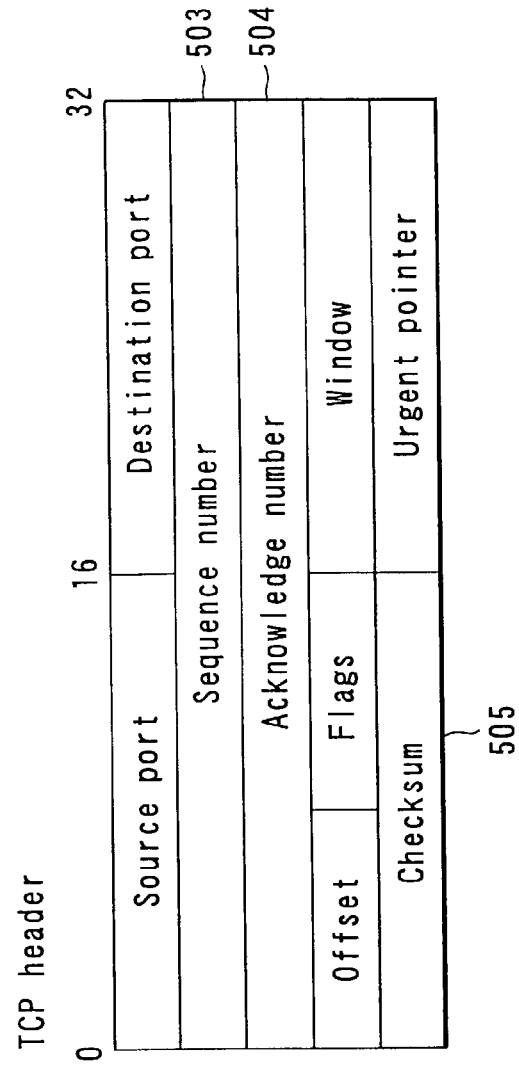
FIG. 10 shows typical TCP header in TCP/IP.

FIG. 9 shows a general IP header in TCP/IP communications, and FIG. 10 illustrates a TCP header. The header correcting unit 210 corrects, of the contents of the IP header, a check sum 500, a destination IP address 501 and a destination IP address 502. Further, the header correcting unit 210 corrects, of the contents of the TCP header, a sequence number 503, an ACK number 504 and a check sum 505.

Usually, the sequence of transmission/reception of packets is controlled on the basis of the sequence number 503. The order of packets is determined by passing the sequence number 503 between the server computer 104 and the client computer 101 in both reception and transmission directions.

Figure 11:
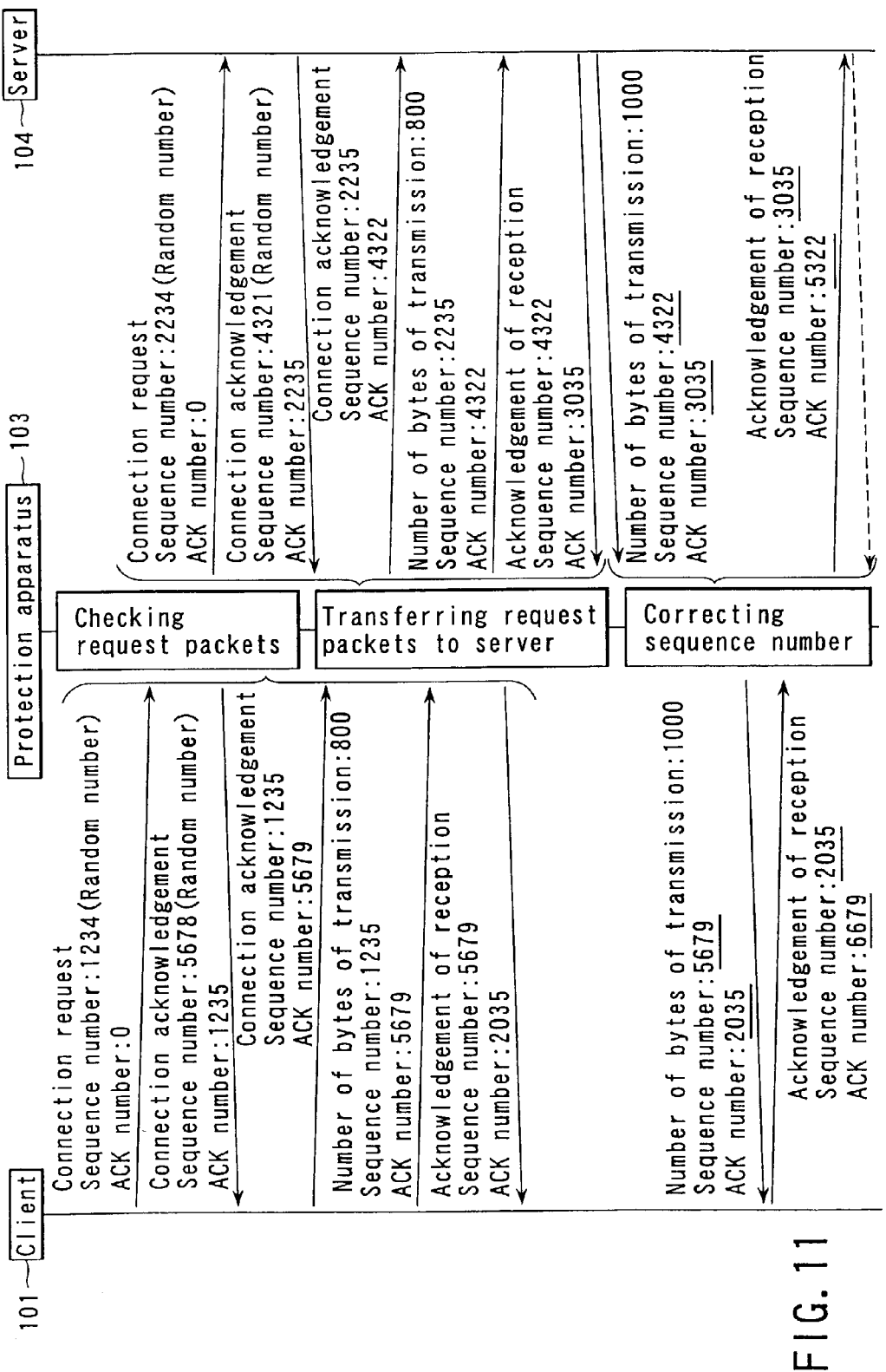
FIG. 11 shows one embodiment of a header correction which is performed by the protection apparatus.

However, when the protection apparatus 103 of this embodiment is to be applied, connecting operation (step S104 in FIG. 3) for a server computer 104 from a client computer 103 is performed after a check on the validity of a data request (step S103 in FIG. 3) from the client computer 101. Therefore, connection processing for a client computer 101 must inevitably be performed with the protection apparatus sequence number arbitrarily generated by the server computer protection apparatus 103 (step S101 in FIG. 3). Since this protection apparatus sequence number differs from the server computer sequence number notified from the server computer 104 in connection processing (step S104 in FIG. 3) for the server computer which is performed after the check, if the packet of the requested data is transmitted without any change, data transmission cannot be done by using the TCP/IP protocol. For this reason, the difference between these sequence numbers is corrected by using the header correcting unit 210, and other header information (e.g., a transmission destination IP address or destination IP address) is corrected for matching, as needed, thereby allowing communication from the server computer 104 to the client computer 101. FIG. 11 shows an example of correction of a header by the protection apparatus 103.

For example, the following operations (a) to (c) are performed by the protection apparatus 103 of this embodiment for one data request:

(a) checking a connection request from the client computer 101 by a data request receiving unit 201, data request checking unit 202, and data request transfer unit 203, and then establishing a connection between the client computer 101 and the server computer 104;

(b) correcting the header of the data request packet sent from the client computer 101 through this connection by using the header correcting unit 210, and then transferring the packet to the server computer 104; and (c) correcting the header of the data packet sent from the server computer 104 through this connection by using the header correcting unit 210, and then transferring the packet to the client computer 101.

According to this embodiment, if the protection apparatus mediates to check access request packets, communications that are carried out between the server computer 104 and the client computer 101 can be established without problems.

(Fifth Embodiment)

Figure 12:
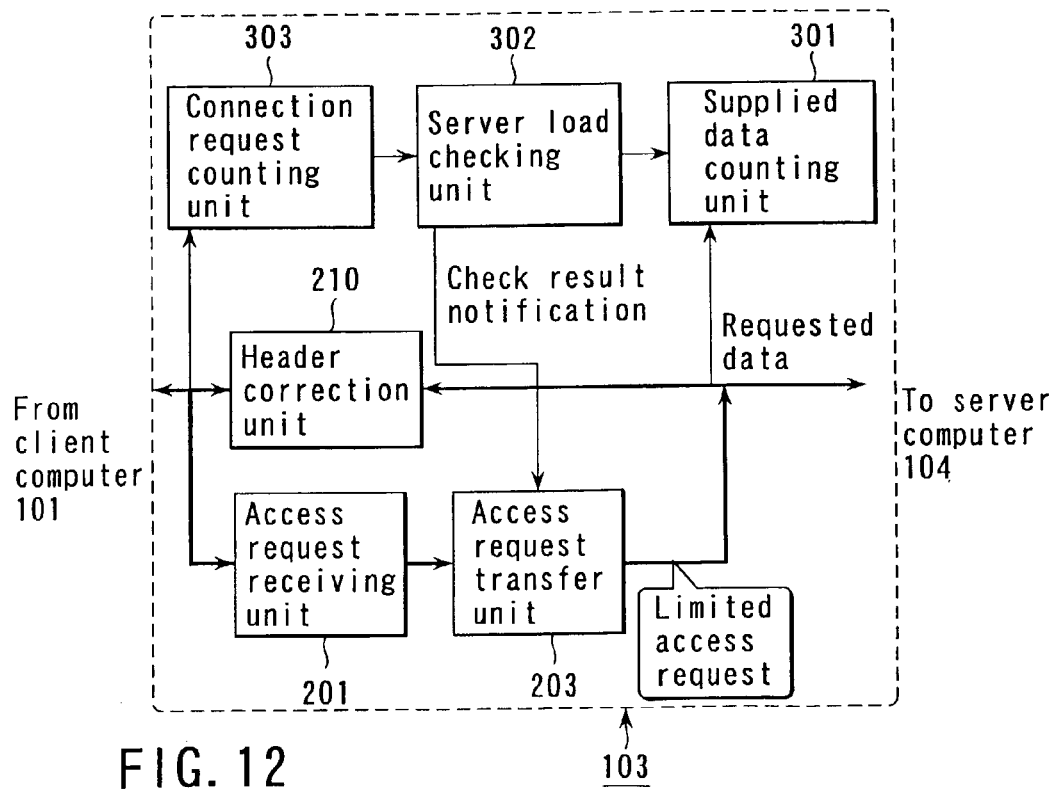
FIG. 12 is a block diagram illustrating a schematic structure of a server computer protection apparatus according to the fifth embodiment of the present invention.

FIG. 12 is a block diagram illustrating a schematic structure of a server computer protection apparatus according to the fifth embodiment of the present invention. A header correction unit 210, which is same as that described in the fourth embodiment, is added to the arrangement of the second embodiment.

As described above, the protection apparatus 103 of the second embodiment protects the server computer 104, on the basis of data supply state, by detecting improper connection requests that may apply the server computer 104 with heavy load. For the purpose of this, there are also provided with a supplied data counting unit 301 and server load checking unit 302 in the protection apparatus of the fifth embodiment. The server load checking unit 302 checks whether the load on the server 104 is excessive or not, based on the number of the data supplied counted by the supplied data counting unit 301 and based on the number of the connection requests counted by the connection request counting unit 303. Specifically, for example, it is determined that the number of connection requests is excessive and hence the server computer 104 undergoes heavy load, if the number of data supplied is relatively small as compared with the number of the connection request packet (SYN packet).

The header correction unit 210 corrects TCP/IP headers such that the packet sequence control after the connection processing can be performed properly even if the protection apparatus 103 interposes between the client computer 101 and server computer 104 to check the load on the server computer 104.

Figure 13:
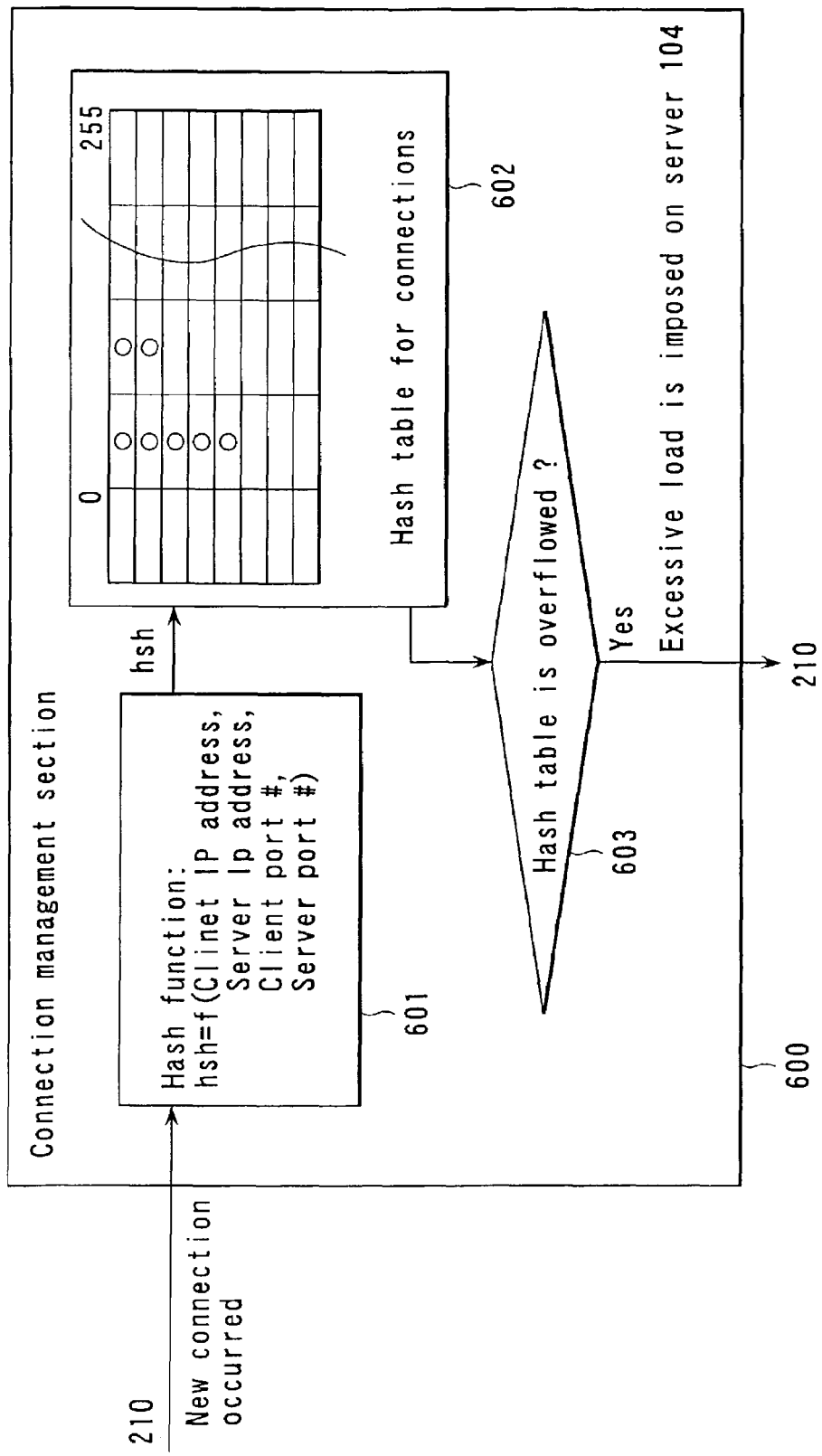
FIG. 13 shows a structure of a connection control unit.

FIG. 13 shows an arrangement of the connection management unit, which is used when the header correction unit 210 manages the connection between the client computer 101 and server computer 104. The connection management unit manages the corresponding relation (connection) between an IP address of the client computer 101, IP address of the server computer 104 and port number by utilizing hash function 601 and hash table 602.

Such the connection management unit can be used for checking the load on server, e.g., in step S202 shown in FIG. 5. Specifically, the server load checking unit 302 determines in step 603 that the load on the server computer 104 is excessive, when the hash table 602 overflows.

Note that the connection management unit shown in FIG. 13 can be incorporated in the arrangement of the second embodiment.

(Sixth Embodiment)

Figure 14:
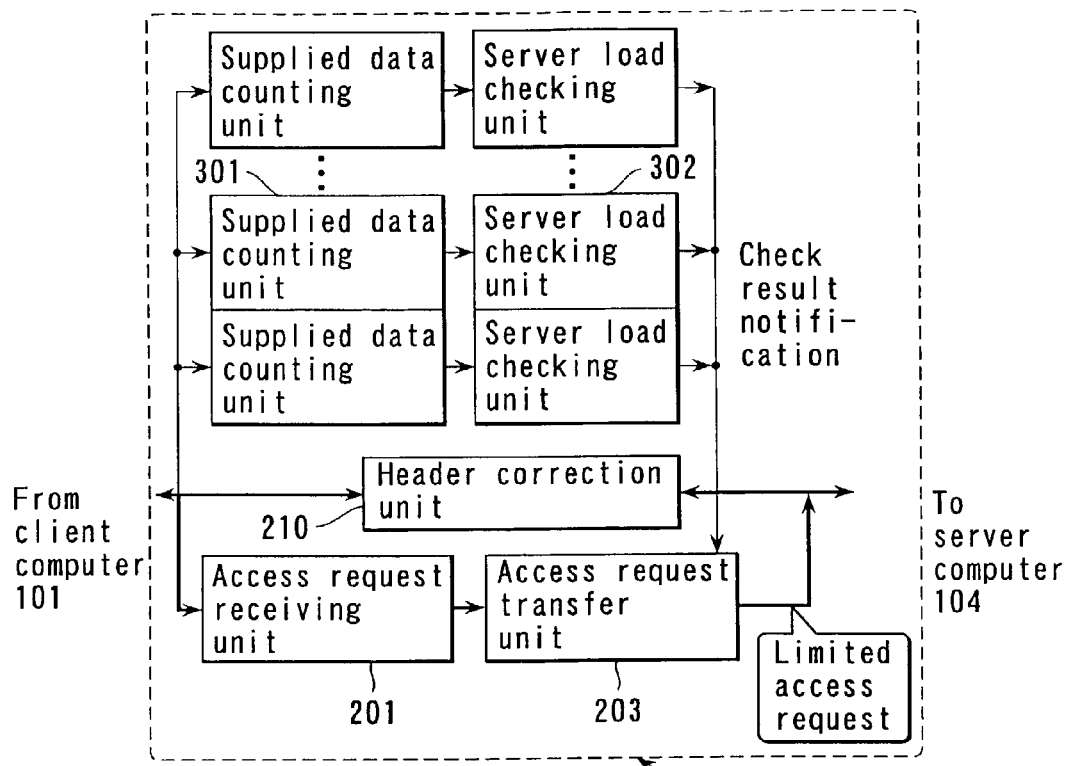
FIG. 14 is a block diagram illustrating a schematic structure of a server computer protection apparatus according to the sixth embodiment of the present invention.

FIG. 14 is a block diagram illustrating a schematic structure of a server computer protection apparatus according to the sixth embodiment of the present invention. A header correction unit 210, which is same as that described in the fourth embodiment, is added to the arrangement of the third embodiment. As described above, the protection apparatus 103 of the third embodiment counts the numbers of data supplied for client computers to check the load on the server computer 104. For the purpose of this, there are also provided with a large number of supplied data counting units 301 and server load checking units 302 in the protection apparatus in the sixth embodiment. Since, for one supplied data counting unit 301 or one server load checking unit 302, a simple computational functionality that will suffice is provided, a large number of supplied data counting units 301 or server load checking units 302 merely consume small amount of resources of memory or CPU in the protection apparatus 103. Accordingly, to cope with the number of 1000 to 10000 of client computers, as many as sets of supplied data counting units 301 and server load checking units 302 can be provided. Note that for a specific client computer, for each of a plurality of established connections, the sets supplied data counting units 301 and server load checking units 302 can be associated respectively.

The header correction unit 210 corrects TCP/IP headers such that the packet sequence control after the connection processing can be performed properly even if the protection apparatus 103 interposes between the client computer 101 and server computer 104 and the protection apparatus 103 checks the load on the server computer 104 with respect to a large number of client computers.

Figure 15:
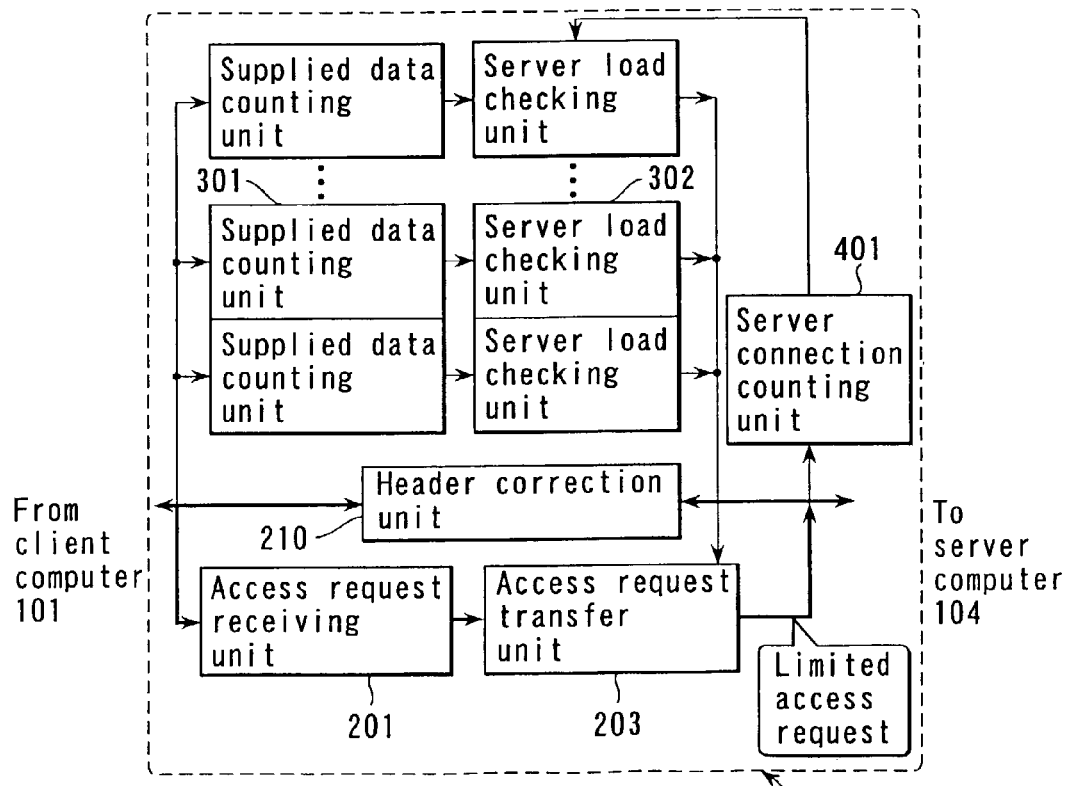
FIG. 15 is a block diagram illustrating a schematic structure of a server computer protection apparatus according to a modification of the sixth embodiment of the present invention.

FIG. 15 is a block diagram illustrating a schematic structure of a server computer protection apparatus according to a modification of the sixth embodiment of the present invention. This modification includes a server connection counting unit 401 for counting the number of connections between the server computer protection apparatus 103 and a server computer 104. The output result from the server connection counting unit 401 is input to a server load checking unit 302 provided for each client computer. The number of connections for each client computer can be counted by a supplied data counting unit 301 provided for each client computer. Since any numbers of connections including the number of connections between the protection apparatus 103 and the server computer 104 and the number of connections for each client computer can be counted inside the server computer protection apparatus 103, server load check processing for each client computer can be facilitated.

(Seventh Embodiment)

Figure 16:
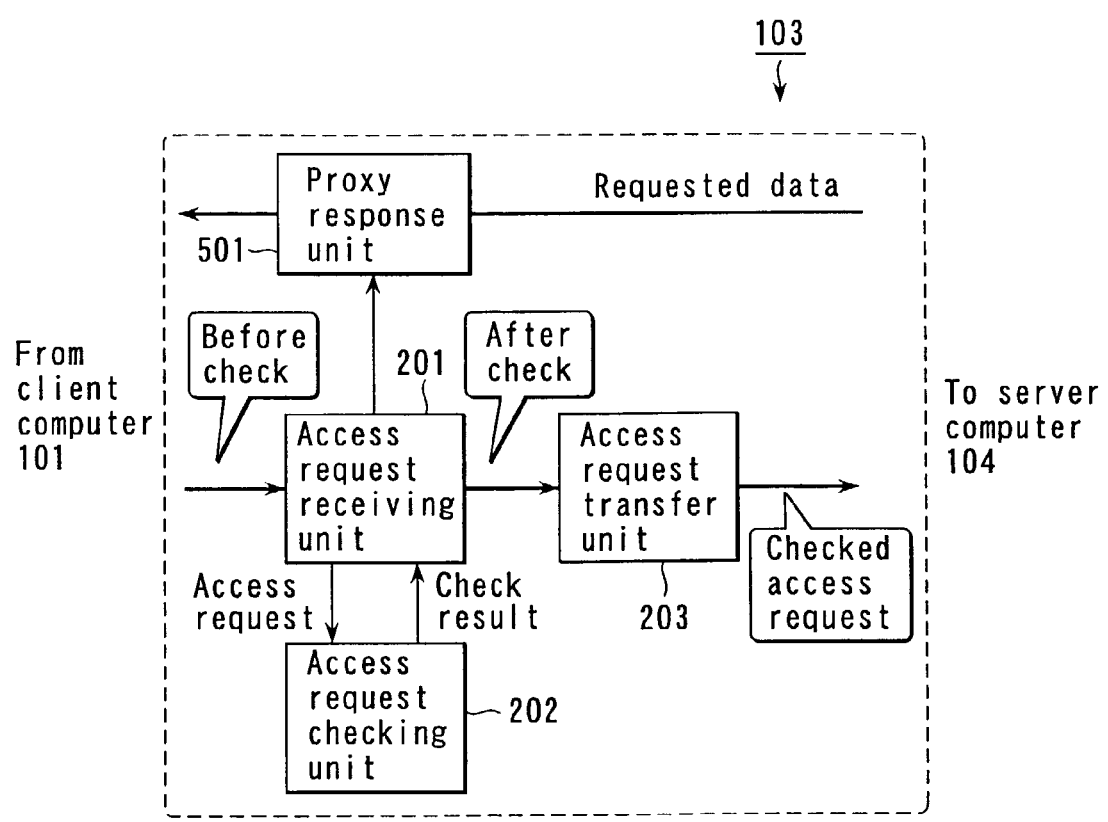
FIG. 16 is a block diagram illustrating a schematic structure of a server computer protection apparatus according to the seventh embodiment of the present invention.
Figure 17:
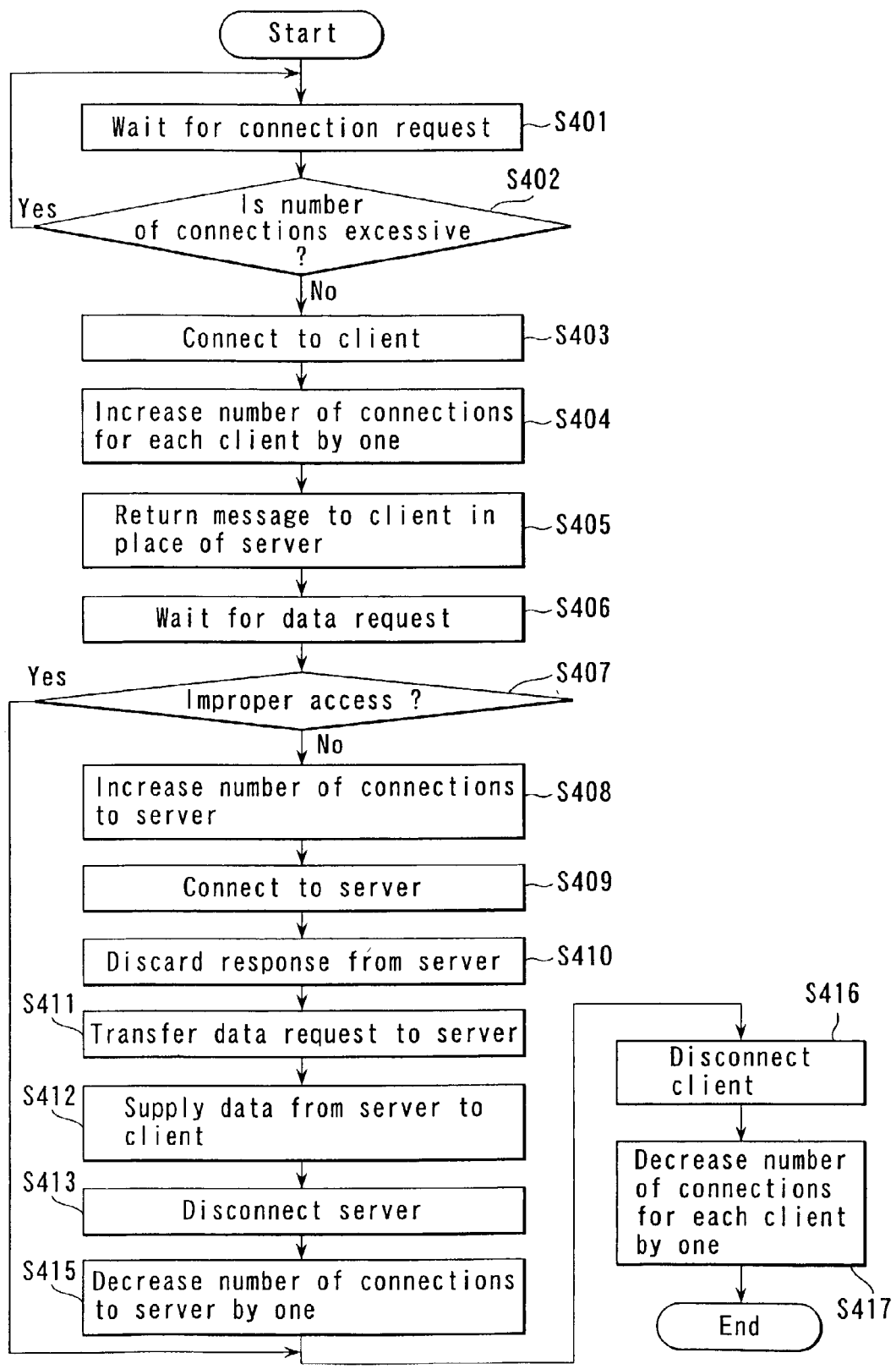
FIG. 17 is a flow chart showing a processing operation of the server computer protection apparatus according to the seventh embodiment of the present invention.
Figures 18, 19:
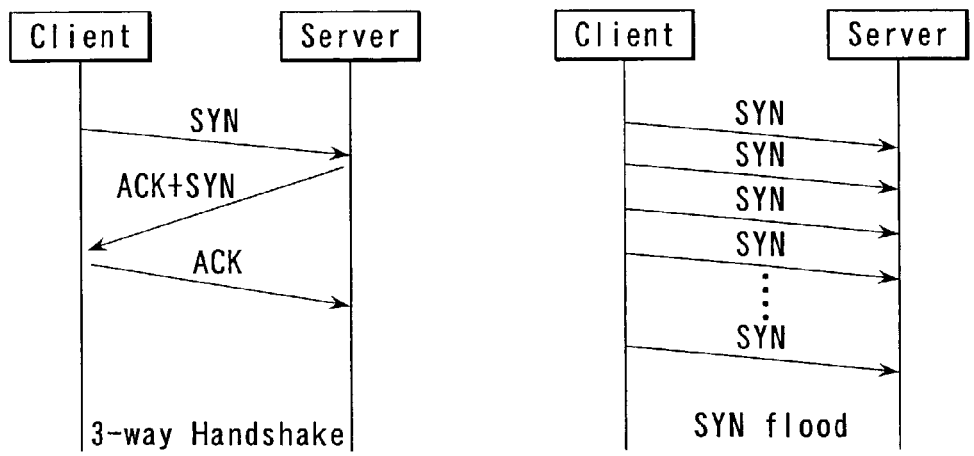
FIG. 18 shows one example of an access request procedure (3-way handshake scheme)
FIG. 19 shows one example of an attack pattern (SYN flood)
Figure 20:
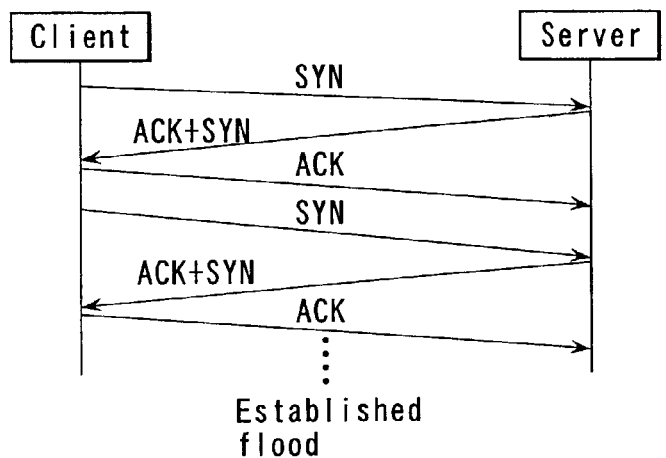
FIG. 20 shows another example of an attack pattern (Established flood)
Figure 21:
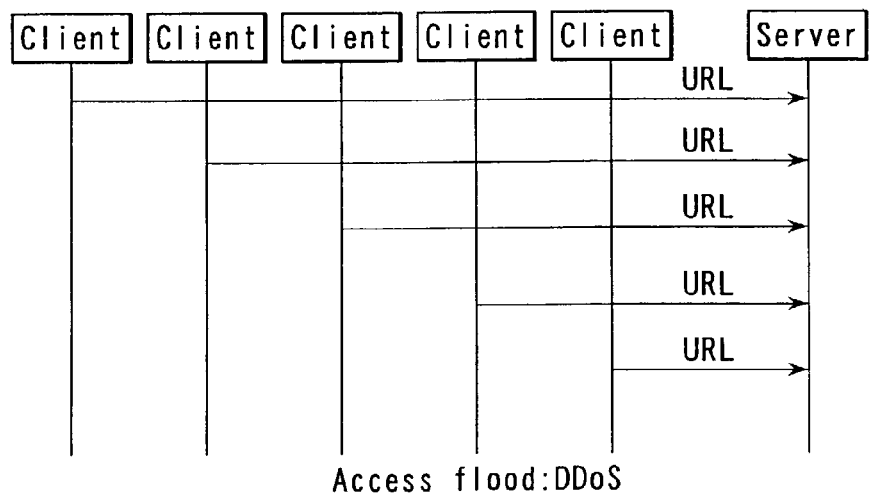
FIG. 21 shows another example of an attack pattern (Access flood).

FIG. 16 is a block diagram illustrating a schematic structure of a server computer protection apparatus according to the seventh embodiment of the present invention. FIG. 17 is a flow chart showing a processing operation of the server computer protection apparatus according to the seventh embodiment of the present invention. This embodiment can be combined with other embodiments, and includes a proxy response unit 501 for responding to the client computer 101 in place of the server computer 104. In order to allow the proxy response unit 501 to substitute as the server computer 104, the proxy response unit 501 must have the header correcting unit 210 described in FIG. 8.

In FIG. 17, a connection is established between the client computer 101 and the protection apparatus 103 according to TCP/IP by the same procedure (S401 to S404) as that described above. Thereafter, i.e., before a data request is sent from the client computer 101, the proxy response unit 501 responds to the client computer 101 in place of the server computer 104 (S405).

To respond means to return a response in a higher level protocol than TCP/IP, e.g., a session protocol, which may be, e.g., SMTP (Simple Mail Transfer Protocol) or POP (Post Office Protocol). In the case of SMTP, the response may be a message indicating a state wherein the server computer 104 can receive an e-mail. Also, in the case of POP, the response may be a message indicating a POP version (e.g., POP3). In general, the proxy response unit 501 returns a message having the same contents as those returned to the client when the server computer 104 operates normally, the same contents as those returned by the server computer 104 by connecting operation based on an upper protocol which is performed between the protection apparatus 103 and the server computer 104 immediately before the responding operation, and the like.

The client computer 101 by which the response is received, determines that connecting operation has been done with the server computer 104 by the upper-level protocol, and shifts to the next operation such as generation of a data transfer request.

The data request receiving unit 201 receives a data request from the client computer 101. The data request checking unit 202 checks the contents of the data request. The data request is then transferred to the server computer 104. The server computer 104 returns predetermined data to the client computer 101 on the basis of the transferred contents. Subsequently, the disconnection procedure is performed (S406 to S417). Examples of this check are to check whether the data request deviates from a predetermined transfer form and to check whether impossible data is requested.

If the data request from the client computer 101 is proper as described above, the protection apparatus 103 performs connecting operation with respect to the server computer 104, and transfers the request from the client computer 101 to the server computer 104. The response returned by the server computer 104 after this connecting operation may possibly go wrong with the response previously returned to the server computer 104 by the server computer protection apparatus 103. For this reason, this response is not transferred to the client as long as no problem arises in processing for the data request. If it is determined that there will arise the problem, the protection apparatus 103 should cancel the connection between the server computer 104 and the client computer 101.

Above described first to seventh embodiments can be modified such that, the above server computer protection apparatus is incorporated in the server computer. In this case, it is desirable that the server computer incorporates hardware such as a memory dedicated for the server computer protection apparatus.

(Application to Recording Medium)

The processing in the above embodiments can be implemented by a program that can be executed by a computer, and the program can be implemented as a computer-readable storage medium.

Note that this storage medium may take any storage form, e.g., a magnetic disk, flexible disk, hard disk, optical disk (CD-ROM, CD-R, DVD, or the like), magneto optical disk (MO or the like), or semiconductor memory, as long as the program can be stored and read out by a computer.

In addition, an OS (Operating System) operating on the computer on the basis of the instructions of a program installed from the storage medium into the computer, an MW (Middle Ware) such as database management software or network, or the like may partly execute each processing for implementing this embodiment.

Note that the above computer executes each processing in this embodiment on the basis of the program stored in the storage medium, and may take any arrangement, e.g., a single apparatus such as a PC or a system formed from a plurality of apparatuses connected to each other through a network.

In addition, the above computer includes an arithmetic processor included in information processing apparatus, a microcomputer, and the like in addition to a personal computer, and is a generic term for devices and apparatuses that can implement the functions of this embodiment by programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server computer protection apparatus for protecting a server computer by allowing only proper access from one or more client computers to reach the server computer, comprising:
    an access request receiving unit that receives, in place of the server computer, server access requests sent from the client computers, wherein the server access requests each include, in sequence, a connection request packet, an acknowledgement packet, and a data request packet requesting the server computer to transmit data to the one or more client computers;
    an access request checking unit that checks each received server access request to determine whether the received server access request is improper, wherein the access request checking unit determines the received server access request to be improper when:
        the access request receiving unit does not receive the data request packet following the acknowledgement packet before a specific period of time elapses after the receipt of the acknowledgment packet, and
        the access request receiving unit has previously received at least one outstanding server access request in which a data request packet was not received following an acknowledgement packet within the specific period of time after receipt of the acknowledgement packet;
    an access request transfer unit which:
        transfers to the server computer only server access requests that are determined to be proper, and
        prevents the transfer to the server computer of server access requests that are determined to be improper; and
    a server load checking unit that checks whether a load on the server computer rises above a predetermined load, based on a ratio of the number of connection request packets and a number of times data is supplied from the server computer,
    wherein the access request checking unit determines that the server access request is not proper when the load rises above the predetermined load, to protect against distribution denial of service attacks.

2. The server computer protection apparatus according to claim 1, wherein the server load checking unit checks the load on the server computer with respect to each of the client computers or each connection.

3. The server computer protection apparatus according to claim 1, further comprising a header correction unit that corrects a header of a packet of the server access request for a sequence control between the client computers and the server computer.

4. The server computer protection apparatus according to claim 1, further comprising a proxy response unit that responds to the client computers in place of the server computer, in accordance with a session protocol that is higher in level than TCP/IP.

5. A method of protecting a server computer by allowing only proper access from one or more client computers to reach the server computer, the method comprising:
    receiving, in place of the server computer, server access requests sent from the client computers, wherein the server access requests each include, in sequence, a connection request packet, an acknowledgement packet, and a data request packet requesting the server computer to transmit data to the one or more client computers;
    checking the received server access requests to determine whether each received server access request is improper, wherein the received server access request is determined to be improper when:
        the data request packet is not received following the acknowledgement packet before a specific period of time elapses after the receipt of the acknowledgement packet, and
        at least one previous outstanding server access request has been received in which a data request packet was not received following an acknowledgement packet within the specific period time after receipt of the acknowledgement packet;
    transferring to the server computer only server access requests that are determined to be proper;
    preventing the transfer to the server computer of server access requests that are determined to be improper;
    checking whether a load on the server computer rises above a predetermined load, based on the ratio of a number of connection request packets and a number of times data is supplied from the server computer; and
    determining that the server access request is improper when the load rises above the predetermined load, to protect against distribution denial of service attacks.

6. The server computer protection method according to claim 5, wherein the load on the server computer is checked with respect to each of the client computers or each connection.

7. The server computer protection method according to claim 5, further comprising correcting a header of a packet of the server access request for a sequence control between the client computers and the server computer.

8. The server computer protection method according to claim 5, further comprising responding to the client computers in place of the server computer, in accordance with a session protocol that is higher in level than TCP/IP.

9. A server computer apparatus which communicates with one or more client computers, comprising:
    a server computer unit; and
    a server computer protection unit including:
        an access request receiving unit which receives, in place of the server computer unit, server access requests sent from the client computers, wherein the server access requests each include, in sequence, a connection request packet, an acknowledgement packet, and a data request packet requesting the server computer apparatus to transmit data to the one or more client computers;

an access request checking unit which checks each received server access request to determine whether the received server access request is improper, wherein the access request checking unit determines the received server access request to be improper when:
- the access request receiving unit does not receive the data request packet following the acknowledgement packet before a specific period of time elapses after the receipt of the acknowledgement packet, and
- the access request receiving unit has previously received at least one outstanding server access request in which a data request packet was not received following an acknowledgement packet within the specific period of time after receipt of the acknowledgement packet;

an access request transfer unit which:
- transfers to the server computer unit only server access requests that are determined to be proper, and
- prevents the transfer to the server computer of server access requests that are determined to be improper; and a server load checking unit that checks whether a load on the server computer unit rises above a predetermined load, based on a ratio of the number of connection request packets and a number of times data is supplied from the server computer unit, wherein the access request checking unit determines that the server access request is improper when the load rises above the predetermined load, to protect against distribution denial of service attacks.

10. A computer-readable storage medium storing a computer program which, when executed by a server computer protection apparatus, causes the server computer protection apparatus to perform a method of protecting a server computer apparatus by allowing only proper access from one or more client computer apparatuses to reach the server computer apparatus, the method comprising:

receiving, in place of the server computer apparatus, server access requests sent from the client computer apparatuses, wherein the server access requests each include, in sequence, a connection request packet, an acknowledgement packet, and a data request packet requesting the server computer apparatus to transmit data to the one or more client computer apparatuses;

checking each received server access request to determine whether the received server access request is improper, wherein the the received server access request is determined to be improper when:
- the data request packet is not received following the acknowledgement packet before a specific period of time elapses after the receipt of the acknowledgement packet, and
- at least one previous outstanding server access request has been received in which a data request packet was not received following an acknowledgement packet within the specific period of time after receipt of the acknowledgement packet;

transferring to the server computer apparatus only server access requests that are determined to be proper;

preventing the transfer to the server computer of server access requests that are determined to be improper;

checking whether a load on the server computer apparatus rises above a predetermined load, based on the ratio of a number of connection request packets and a number of times data is supplied from the server computer; and determining that the server access request is improper when the load rises above the predetermined load, to protect against distribution denial of service attacks.

11. The computer-readable medium according to claim 10, wherein the load on the server computer apparatus is checked with respect to each of the client computer apparatuses or each connection.

12. The computer-readable storage medium according to claim 10, the method further comprising correcting a header of a packet of the server access request for a sequence control between the client computer apparatuses and the server computer apparatus.

13. The computer-readable storage medium according to claim 10, the method further comprising responding to the client computer apparatuses in place of the server computer apparatus, in accordance with a session protocol that is higher in level than TCP/IP.

* * * * *

UNITED STATES PATENT AND TRADEMARK OFFICE
CERTIFICATE OF CORRECTION

| | |
|---|---|
| PATENT NO. | : 7,478,425 B2 |
| APPLICATION NO. | : 10/241565 |
| DATED | : January 13, 2009 |
| INVENTOR(S) | : Kanno et al. |

Page 1 of 1

It is certified that error appears in the above-identified patent and that said Letters Patent is hereby corrected as shown below:

Claim 5, column 14, line 31, change "period time" to --period of time--.

Signed and Sealed this

Tenth Day of March, 2009

JOHN DOLL
*Acting Director of the United States Patent and Trademark Office*